United States Patent [19]
Jesinger

[11] Patent Number: 4,764,086
[45] Date of Patent: Aug. 16, 1988

[54] BLOWER FOR CIRCULATING LARGER GAS VOLUMES, IN PARTICULAR FOR HIGH-POWER LASER SYSTEMS

[75] Inventor: Richard Jesinger, Esslingen, Fed. Rep. of Germany

[73] Assignee: Fortuna-Werke Maschinenfabrik GmbH, Stuttgart, Fed. Rep. of Germany

[21] Appl. No.: 946,588

[22] Filed: Dec. 24, 1986

[30] Foreign Application Priority Data

Jan. 4, 1986 [DE] Fed. Rep. of Germany ....... 3600126

[51] Int. Cl.⁴ ............................................. F04D 29/10
[52] U.S. Cl. .................................... 415/112; 415/174; 277/81 R; 384/123; 384/473
[58] Field of Search .............. 415/110, 111, 112, 113, 415/170 R, 170 A, 172 R, 173 R, 169 R, 169 A, 174, 175; 277/174, 93 R, 93 SD, 88, 81 R, 96.1; 384/107, 111, 112, 113, 114, 123, 378, 473, 474, 483; 417/366

[56] References Cited

U.S. PATENT DOCUMENTS

| | | | |
|---|---|---|---|
| 2,913,989 | 11/1959 | Boardman et al. | 415/112 |
| 3,194,492 | 7/1965 | Koffinke et al. | 415/170 A |
| 3,532,444 | 10/1970 | Strub | 415/112 |
| 3,942,716 | 3/1976 | Jacobson et al. | 494/15 |
| 3,951,573 | 4/1976 | Dunning et al. | 417/424 |
| 3,960,245 | 6/1976 | Weinrich | 417/366 |
| 3,976,165 | 8/1976 | Pilarczyk | 415/110 |
| 4,087,097 | 5/1978 | Bossens et al. | 277/65 |
| 4,193,603 | 3/1980 | Sood | 415/112 |
| 4,242,039 | 12/1980 | Villard et al. | 415/112 |
| 4,376,540 | 3/1983 | Kotzur et al. | 277/88 |
| 4,500,093 | 2/1985 | Kapich | 277/15 |

FOREIGN PATENT DOCUMENTS

| | | |
|---|---|---|
| 365748 | 2/1982 | Austria . |
| 648513 | 5/1964 | Belgium . |
| 487536 | 11/1929 | Fed. Rep. of Germany . |
| 908692 | 12/1941 | Fed. Rep. of Germany . |
| 877519 | 6/1942 | Fed. Rep. of Germany . |
| 865844 | 8/1949 | Fed. Rep. of Germany . |
| 1018187 | 10/1957 | Fed. Rep. of Germany . |
| 1178519 | 5/1959 | France . |
| 1505487 | 11/1967 | France . |
| 2215860 | 8/1974 | France . |
| 380283 | 9/1960 | Switzerland . |
| 480543 | 10/1969 | Switzerland . |
| 682358 | 11/1952 | United Kingdom . |

*Primary Examiner*—Robert E. Garrett
*Assistant Examiner*—John T. Kwon
*Attorney, Agent, or Firm*—Majestic, Gallagher, Parsons & Siebert

[57] ABSTRACT

A blower is used for circulating larger gas volumes, in particular for high power laser systems which operate according to the gas-transportation principle. The blower comprises a radial feeder being arranged in a connection between two gas ducts. The radial feeder is driven by a vertical shaft, rotating at high rotary speed. In order to permit extremely large gas volumes, typically in the range of several ten thousand cubic meters per hour, to be circulated, the shaft is seated in a pressure-tight housing. Two axially acting seals are arranged on the shaft at a certain distance from the radial feeder. The seals define a pump chamber connected with one of the gas ducts, a lock chamber and a drive chamber. The seal between the lock chamber and the drive chamber comprise an axial upper sliding ring resting elastically on a lower thrust ring. A lubricating-oil channel, connected to an axial lubricating oil supply duct in the drive shaft, has an upper bore connecting the channel with an opening in a sliding surface between the sliding ring and the thrust ring.

13 Claims, 4 Drawing Sheets

BLOWER FOR CIRCULATING LARGER GAS VOLUMES, IN PARTICULAR FOR HIGH-POWER LASER SYSTEMS

The present invention relates to a blower for circulating larger gas volumes, in particular for high-power Laser systems operating according to the gas-transportation principle, comprising a gas transportation portion and a drive portion, the gas transportation portion being provided with a radial feeder arranged in a connection between two gas ducts of the gas transportation portion and the drive portion comprising a shaft for driving the radial feeder at high rotary speeds, the shaft being seated in a pressure-tight housing by means of radial pivot bearings, with at least two axially acting seals being arranged on the shaft at a certain distance from the radial feeder, which seals, viewed from the radial feeder, form in axial succession a first chamber, at least one lock chamber and a drive chamber housing the radial pivot bearings, the at least one lock chamber and the drive chamber being equipped with pressure fluid supply or discharge lines.

A blower of this type has been known before from Swiss patent specification No. 480 543.

The known blower comprises a horizontal drive shaft carrying on its free end a horizontally acting radial feeder and on its other end an axial gas bearing. Following the radial feeder, the shaft is surrounded by an annular inner chamber which in turn is followed, in the direction opposite the radial feeder, by a fluid packing. The fluid packing consists of a radially tight bearing for the shaft and a central annular chamber into which sealing fluid can be introduced under overpressure through a line. The fluid packing is followed, at the side facing away from the inner chamber, by a motor compartment housing an electric motor serving to drive the blower. The inner chamber and the motor compartment, too, are provided in their areas adjacent the liquid packing with annular chambers of larger radius, which serve as collecting chambers and which are provided with suitable lines leading to separating devices, expulsion devices and compressors.

The known blower is intended for circulating gases which, constituting a danger to health and life in the environment, must be prevented by any means from penetrating out of the blower.

To this end, a liquid packing is provided. The sealing liquid entering the annular chamber of the liquid packing under pressure passes the radially narrow sections and enters the inner chamber and the motor compartment where they are collected in the collecting devices and then transmitted via the lines to the separating devices and the expulsion devices in order to be recirculated for being re-used. The transporting gas and/or gas of the motor compartment entrained during this process is also separated and recirculated into the gas transport chamber and the motor compartment.

However, it is a disadvantage of the known blower that any sealing fluid evaporating in the inner chamber may also enter the area of the transporting gas flow, or may get into the area of the drive through the motor compartment.

It is, therefore, necessary in the case of the known blower to use a sealing liquid which is uncritical when admixed, at least when admixed in traces, to the transporting gas and/or the area of the drive. This must, however, be regarded as a disadvantage because such conflicting requirements cannot possibly be fulfilled by any sealing liquid.

From U.S. Pat. Specification No. 3 951 573, another blower of a similar type has been known where the rear and/or bottom face of the radial feeder and a stationary counterface of the housing form together an axial spiral flute bearing. In the case of this known blower, the shaft is arranged vertically, and the weight of the shaft and of the radial feeder is supported by the before-mentioned axial spiral flute bearing.

There are no special seals or lock arrangements provided along the shaft in the case of this known blower.

Different other embodiments of gap seals and sliding-ring seals have been known before from German patent specification No. 908 692, German patent specification No. 877 519 and German patent specification No. 865 844.

Finally, German Disclosure Document No. 32 45 959 describes a blower serving to circulate, in a Laser operating according to the gas-transportation principle, a gas, for example $CO_2$ or an $N_2/He$ mixture, between an excitation section and a cooling section. As is generally known, it is a fact that in the case of such Lasers certain performance data drop as the temperature of the Laser gas rises. The known arrangement is, therefore, to ensure by continuous circulation of the gas between the excitation section and a heat exchanger that the gas temperature is always maintained at a sufficiently low level.

If the arrangement is to be used in connection with high-power Lasers with very high power outputs, it is necessary that the gas be circulated in the Laser at delivery rates of several 1,000 or 10,000 cubic meters per hour. This requires rotary speeds of the radial feeder in the range of several 10,000 to 100,000 revolutions per minute, and this leads on the other hand to circumferential speeds of the radial feeder of more than 600 meters per second and requires a drive power in the range of several 10 KW.

The known arrangement does not provide any information as to how the radial or tangential feeder is to be driven.

Now, it is the object of the present invention to improve a blower of the type described above so that lubricants or sealing liquids, or even traces thereof, will be prevented under any circumstances from entering the circulated gas.

According to the invention, this object is achieved by an arrangement in which the radial feeder is provided on its bottom face with spiral grooves extending in the plane of the said bottom face so that the first chamber acts as a pump chamber connected with the gas ducts, in which the lock chamber is connected with a vacuum pump which adjusts the pressure prevailing in the lock chamber to a pressure somewhat lower than that prevailing in the pump chamber, and in which the drive chamber is connected with a lubricating-oil pump.

This solves the object underlying the invention fully and completely because it is now possible to guarantee at any time a liquid flow from the pump chamber into the lock chamber, and not in the opposite direction, so that fluid, in particular transporting gas, can flow only from the pump chamber into the lock chamber, even in the case of varying pressure conditions in the pump chamber, and no lubricants or sealing agents whatever can penetrate from the lock chamber into the pump chamber and, thus, into the circulated gas.

This is a particular advantage because the defined pressure zones along the shaft make it possible on the one hand to maintain the pressure conditions which are predetermined by the particular application, for example the Laser, while on the other hand the bearing and lubricating system of the blower drive can be optimized under the aspects of high performance.

For example, a Laser whose gas consists of a mixture of 75 % nitrogen and 25% helium, can be operated at a gas pressure in the range of 100 to 150 mbar. If the radial feeder has a diameter of between 50 and 500 mm and a drive power of between 1 and 50 KW, rotary speeds of between 20,000 and 180,000 revolutions per minute and delivery volumes of between 800 and 20,000 cubic meters per hour can be reached; the pressure that can be adjusted in the bearing and lubricating system may be up to 10 bar above the pressure of the Laser gas.

The invention warrants in this performance range that optimum high-speed operation can be guaranteed for the before-mentioned drive powers so as to achieve the stated delivery rates, and ensures at the same time that no lubricant can penetrate from the high-pressure lubricating and bearing system into the pump chamber, i.e. the gas chamber, for example that of the Laser.

The invention therefore provides the advantage that a three-stage pressure profile can be adjusted along the axis of the drive shaft, the lock chamber acting as a buffer between the pump chamber and the drive chamber, so that any lubricant penetrating from the high-pressure drive chamber through the sliding seals is carried away from the lock chamber before it can enter the pump chamber.

According to another preferred embodiment of the invention, the drive chamber is connected in addition to a compressed-air pump for adjusting a higher pressure in the drive chamber than that prevailing in the lock chamber.

This feature provides the advantage that the pressure prevailing in the drive chamber can easily be adjusted in a controlled manner in the area adjacent the lock chamber, using compressed air, it being only necessary to have the lubricating oil enter this area in an unpressurized state. The mixture of lubricating oil/compressed air then forms an aerosol which is immediately drawn off through the line leading to the vacuum pump in case it should penetrate into the lock chamber.

A particularly preferred embodiment of the invention is characterized in that the lubricating-oil pump delivers oil from an oil pan and that the oil pan is connected via a return oil pump with an oil separator preceding the vacuum pump.

This feature provides the advantage that an absolutely closed circuit is available for the lubricants. For example, the lubrication oil contained in the extracted aerosol is recycled by means of the oil separator and the return oil pump.

In addition, a particularly good effect is achieved in such a system when a liquified gas, preferably freon, is admixed to the oil in the oil pan, when an inlet of a compressor, by which the gas evaporating from the oil is condensed, is connected to the oil pan above the oil level, and when the gas liquified by condensation is finally admixed again to the oil.

In this manner, particularly effective cooling of the bearings and possibly also of the drive elements and the blower drive is achieved because the liquified gas that has been admixed to the oil reaches in this form the lubricating and cooling points where it evaporates so that an additional cooling effect is achieved through the cold resulting from evaporation. The evaporated gas then returns to the oil pan, together with the lubricating oil, where it is condensed in a closed circuit and reduced to the liquid phase in which it is once more admixed to the oil.

In certain embodiments of the invention, the seals are provided with at least one axial and/or radial sliding sealing face.

In one particular embodiment of the invention, the seal between the pump chamber and the lock chamber is a radial sliding-ring seal with an axial sliding-ring face acting between the housing and the shaft.

This feature provides the advantage that a seal of simple construction can be employed in the area immediately adjacent the pump chamber for separating two spaces filled substantially with gas, namely the pump chamber and the lock chamber.

According to another embodiment of the invention, the seal between the lock chamber and the drive chamber is an axial sliding-ring seal with a radial sliding-ring face acting between the housing and the shaft.

This feature provides the advantage that the axial sliding-ring seal is particularly well suited for sealing the high-pressure drive chamber which is filled — as mentioned before — with a highly pressurized lubricating oil and/or a lubricating-oil/compressed-air aerosol.

Preferably, the axial sliding-ring seal is designed in such a manner that an axial sliding ring resting elastically on a thrust ring is provided between the lock chamber and the drive chamber. In particular, the axial sliding ring is connected about one circumference with one end of a bellows whose other end rests against one circumference of the housing, the thrust ring being seated on the shaft.

This feature offers the advantage to provide a very simple and safe axial seal where the spaces to be sealed against each other, i.e. the lock chamber and the drive chamber, are separated substantially by the bellows. The feature to arrange the thrust ring on the shaft provides the advantage that the thrust ring can easily be fixed on the shaft by shrinking and may at the same time serve to retain other elements on the shaft, for example the shaft bearings.

According to a further improvement of this embodiment of the invention, the thrust ring comprises at least one lubricating-oil channel with a bore connecting the said channel with the sliding surface between the sliding ring and the thrust ring.

This feature offers the substantial advantage to ensure simultaneous cooling and lubrication of the axial sliding-ring seal which under the operating conditions described above may have a circumferential speed of, say, 120 m/sec. The lubricating oil flowing through the thrust ring at a rate that can be suitably adjusted, does not only carry off the frictional heat generated in the sliding-ring seal, but lubricates at the same time the sliding face and reduces in this manner the frictional heat before it is even generated.

Another preferred variant of this embodiment of the invention is characterized by the fact that a radial pivot bearing is arranged beside the thrust ring for seating the shaft in the housing and that a further bore in the thrust ring leading from the channel to the surface thereof is directed towards the radial pivot bearing.

One obtains in this manner the substantial advantage that the lubricating oil does not only serve to cool and to lubricate the axial sliding-ring seal, but ensures in addition the lubrication of the bearing of the shaft, providing the additional side effect that the simultaneous lubrication of the bearing requires a higher throughput of lubricating oil which in turn improves the cooling effect on the thrust ring. In addition, a particularly simple design is achieved due to the fact that a single lubricating-oil supply suffices for lubricating and cooling simultaneously the axial sliding-ring seal and the shaft bearing.

According to a particularly preferred improvement of this embodiment, several channels and bores or additional bores are distributed about the periphery of the thrust ring.

For, this ensures a particularly uniform supply of lubricating oil and, at the same time, a particularly high throughput of lubricating oil.

In the case of the before-described embodiments of the invention, the sliding-ring seals are, preferably, designed in such a manner that the parts forming the seal consist at least partly of metal or of a plastic-impregnated coal or graphite or of plastic or a ceramic material, or of combinations of any of the before-mentioned materials.

These features are particularly advantageous, as has been proved by practical tests.

According to still other embodiments of the invention, the sliding faces of the seals are defined by appropriate adjustment or finishing of the surfaces and set parallel to each other in such a manner that a defined tumbling motion is produced in the seals during rotation of the shaft.

This feature provides the advantage that the defined tumbling motion leads to the formation of lubricating wedges which also ensure particularly efficient lubrication of the sliding-ring seals.

The same applies analogously to still other embodiments of the invention, where the sliding faces of the seals are provided with spiral transporting grooves with either a positive or a negative transporting sense.

This feature also provides the advantage that a self-lubricating effect is achieved.

According to one embodiment of the invention, sensors are provided for sensing the pressure prevailing in the lock chamber and in the pump chamber, the sensors are connected to a controller, and the output of the controller is actively connected with the compressed-air pump and the vacuum pump so that predetermined pressure differences or predetermined pressure quotients are obtained between the pump chamber, the lock chamber and the drive chamber for different blower speeds.

This feature permits in particular to allow for the special conditions occurring during the starting and running-out phases of the blower. For, if the object underlying the present invention is to be achieved also under these operating conditions, it is necessary that the pressures prevailing along the axial direction of the drive shaft be monitored and that corresponding correcting variables be derived therefrom. With the aid of the before-described features it is now possible to pick up the two before-mentioned pressure values and to allow in this manner for the fact that lower rotary speeds lead simultaneously to lower delivery pressures of the radial feeder. Now, this latter pressure is compared with the vacuum generated by the vacuum pump in the lock chamber, and suitable correcting variables are derived for the vacuum pump and the compressed-air pump so that a defined pressure profile, which in addition can be optimized for different speeds, can be maintained across the different chambers. In addition, it is of course also possible to act directly upon the vacuum pump of the Laser by means of the signals delivered by the sensors.

Other advantages of the invention will become apparent from the following description and the attached drawing.

It is understood that the features that have been described above and that will be described hereafter, can be employed not only in the described combinations, but also in other combinations or individually, without leaving the scope of the present invention.

In particular, it is understood that the described application for Lasers operating according to the gas-transportation principle, is to be regarded as an example only and that the blower according to the invention can of course be used also in numerous other applications where gas throughputs at high delivery rates are required in connection with industrial production processes.

Certain embodiments of the invention are illustrated in the drawing and will be described hereafter with reference to the drawing, in which.

Figure 1:
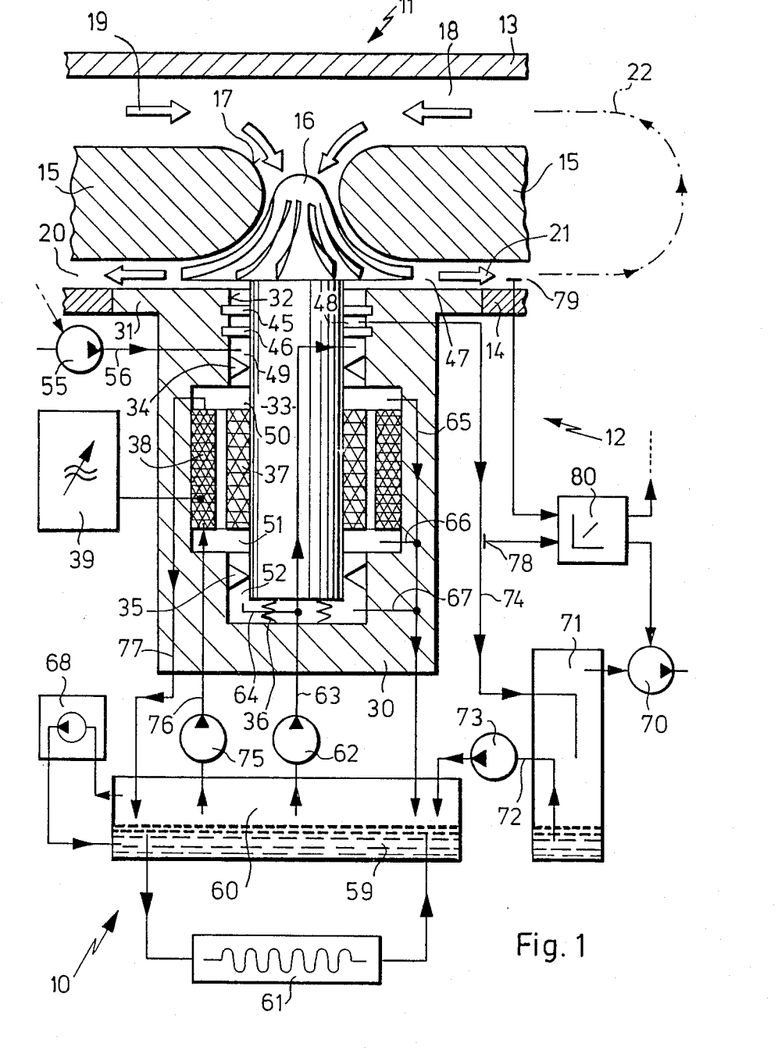
FIG. 1 is an overall diagrammatic representation of a blower according to the invention, with its pressure fluid circuits.

In FIG. 1, one embodiment of a blower according to the invention is designated generally by reference numeral 10. The blower 10 is made up roughly by a gas transportation portion 11 and a drive portion 12.

The gas transportation portion 11 comprises all elements required for transporting and guiding the gas. There are provided to this end, between an upper limiting wall 13 and a lower limiting wall 14, guiding and separating elements 15 leaving between them a connection passage accommodating a radial feeder 16. The surface contour 17 of the guiding and separating elements 15 is adapted to the associated surface contour of the radial feeder 16.

The gas transportation portion 11 thus comprises an upper gas duct 18 through which a gas, for example an inert gas mixture, can flow in the direction indicated by the arrows 19, and a lower gas duct 20 through which the gas flows in the direction indicated by the arrows 21. The gas ducts 18, 20 meet in the area of additional deflection elements as indicated by the line 22 in FIG. 1.

When the blower 10 according to the invention is used, for example, in connection with a high-power Laser, the upper gas duct 18 may form the excitation section, while the lower gas duct 20 may conveniently comprise one or more heat exchangers for cooling the recirculated gas.

It is further understood that the direction of the arrows 19, 21 as indicated in the drawing may also be reversed if the blades of the radial feeder 16 are sized accordingly. Further, it is also stressed once more that the application in connection with Lasers operating according to the gas-transportation principle is to be regarded only as an example used for illustration purposes and that the invention is by no means limited to this application.

The drive portion 12 comprises substantially a cylindrical housing 30 ending at its upper end in an annular flange 31 which may be integrated into or welded to the lower limiting wall 14.

The annular flange 31 is provided at its center with an opening 32 which is passed by a shaft 33 on which the radial feeder 16 is mounted to rotate therewith.

The shaft 33 is seated in an upper radial bearing 34 and a lower radial bearing 35, with a resilient support 36 being provided between its lower end and the housing 30.

It is to be noted in this connection that the terms "upper" and "lower" as used in the present context are to be understood only as an example, as are the representations of the different figures. The blower according to the invention may of course be installed also in horizontal or reverse position without leaving the scope of the invention.

The shaft 33 is provided with a rotor winding 37 arranged between the radial bearings 34 and 35. A stator winding 38 is arranged opposite the rotor winding 37 at the housing 30. The stator winding 38 is connected with a supply unit 39 which generates an electric supply voltage of suitable amplitude and frequency, in particular of variable frequency. The supply unit 39 has, typically, a power output of 50 KW, the output frequency being adjustable between 700 and 3000 Hz.

The supply unit 39 comprises further evaluation units — which are not shown in the drawing for the sake of clarity — for monitoring the lubricating-oil temperature, the lubricating-oil quantity and the power consumption, as well as a detection circuit for bearing defects, and the like. All theses units are, however, known as such so that they need not be described in detail in connection with the present invention.

There can be seen in the drawing above the upper radial bearing 34, but below the opening 32, an upper seal 45 and a lower seal 46. These seals 45, 46 acting in the axial direction of the shaft 33 define a pump chamber 47 above the upper seal 45 which communicates with the lower gas duct 20, and further a lock chamber 48 between the seals 45, 46, and a first drive chamber 49 between the lower seal 46 and the upper radial bearing 34.

For the purposes of the present description, the chamber between the upper radial bearing 34 and the rotor winding 37 and/or the stator winding 38 is designated as second drive chamber 50, while the chamber between the rotor winding 37 and/or the stator winding 38 and the lower radial bearing 35 is designated as third drive chamber 51, and the chamber below the lower radial bearing 35, which accommodates also the resilient support 36, is designated as fourth drive chamber 52.

Different pressure fluid circuits are connected to the drive portion 12 of the blower 10.

A compressed-air pump 55 or a usual compressed-air unit is connected with the first drive chamber 49 via a compressed-air line 56.

An oil pan 60 contains oil 59 intended for lubricating and cooling the different bearing and drive elements. The oil pan 60 is connected to a heat exchanger 61 in order to keep the temperature of the oil continuously at a pre-determined low level.

A lubricating-oil pump 62 delivers oil 59 from the oil pan 60 into a first lubricating-oil line 63 passing through the housing 30 in the direction of the axis of the shaft 33. The first lubricating-oil line 63 then passes through the shaft 33 at first axially and then radially outwardly, ending finally in the first drive chamber 49.

A second lubricating-oil line 64 branches off the first lubricating-oil line 63 in the fourth drive chamber 52 and serves for supplying oil directly to the lower radial bearing 35.

A third lubricating-oil line 65 departs from the second drive chamber 50, is joined by a fourth lubricating-oil line 66 arriving from the third drive chamber 51 and a fifth lubricating-oil line 67 arriving from the fourth drive chamber 52 and leads finally back into the oil pan 60.

The oil 59 may contain a quantity of liquifiable gas, for example freon. The oil containing the admixture of liquified freon is supplied to the different cooling and lubricating points where the freon vaporizes due to the temperature prevailing at these points so that the cooling process is further supported by the cold resulting from the evaporation process.

The freon in the gaseous phase is then returned to the oil pan 60 where it is drawn off and supplied to a condenser 68 which condenses it until it assumes again its liquid phase, whereafter the liquified freon is admixed again to the oil 59.

There is further provided a vacuum pump 70 which is preceded by an oil separator 71. An oil return line 72 leads from the oil sump of the oil separator 71 into the oil pan 60, via a return oil pump 73.

The input of the oil separator 71 is connected with a suction line 74 leading to the lock chamber 78.

There is further provided a cooling-oil pump 75 delivering oil 59 from the oil pan 60 to a first cooling-oil line 76 which leads into the area of the stator winding 38 to cool the latter. A second cooling-oil line 77 leads from this point back to the oil pan 60.

Finally, a first pressure sensor 78 and a second pressure sensor 79, which are actively connected with a controller 80, are provided on the suction line 74 and on the pump chamber 47, respectively. The output of the controller 80 is connected to control inputs of the vacuum pump 70 and the compressed-air pump 55, respectively. In addition, the controller 80 may also be connected to the vacuum pump of the Laser if the blower 10 according to the invention is used in connection with a Laser.

Figure 2:
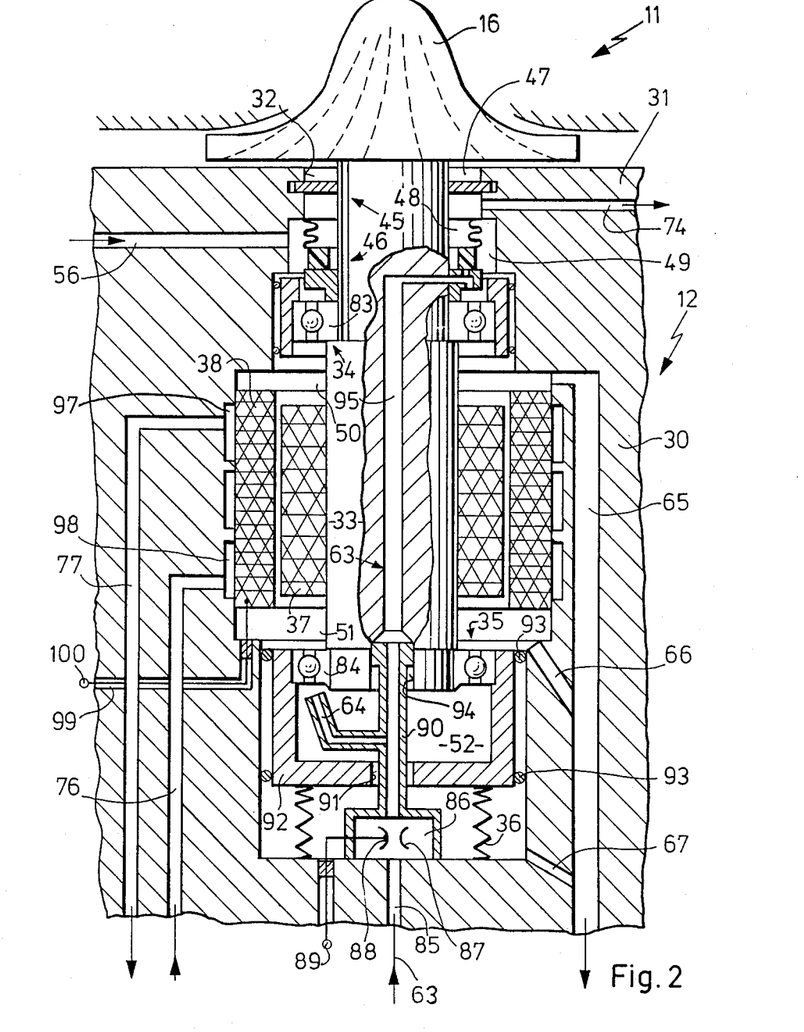
FIG. 2 is an enlarged representation of the mechanical details of the drive of the blower illustrated in FIG. 1.
Figure 3:
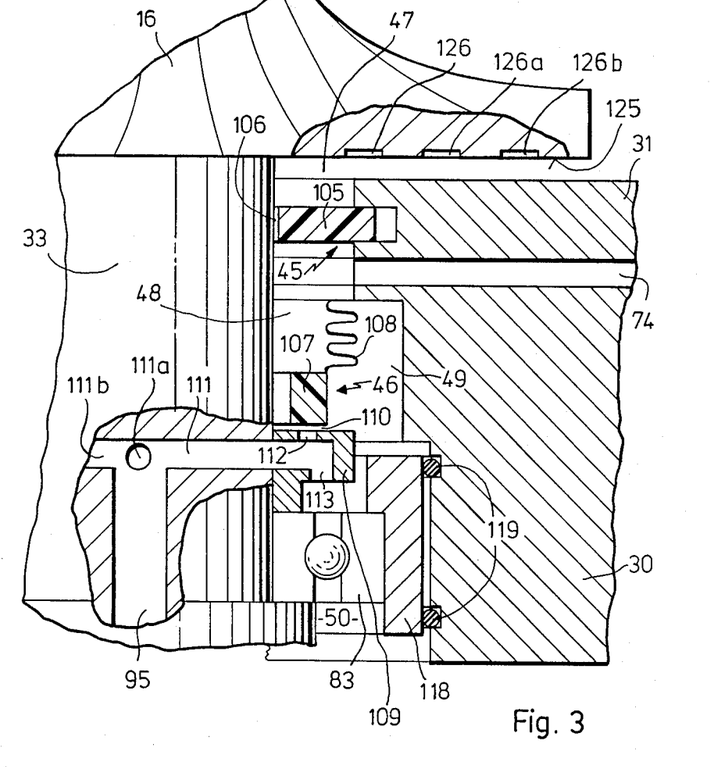
FIG. 3 is a still further enlarged representation of a detail of FIG. 2, illustrating the seals and bearings used according to the invention.

FIGS. 2 and 3 show certain details of the blower 10 of which FIG. 1 gives a diagrammatic overall view.

It can be seen in FIG. 2 that the radial bearings 34, 35 are designed preferably as ball bearings 83, 84.

Further, it can be seen that the first lubricating-oil line 63 is formed initially by an axial channel 85 in the housing 30. The channel 85 ends in a measuring unit 86 comprising a Venturi tube 87. The Venturi tube 87 is equipped with a pressure sensor 88 which is connected with a socket 89 by means of a suitable cable.

The measuring unit 86 is part of an injection-molded part 90 connected with the housing 10. The injection-molded part 90 passes, at a point above the measuring unit 86, through an opening 91 in a bushing 92 which is held in floating relationship in the housing 30 by means of O-rings 93. Between the O-rings 93, there may be provided an oil cushion, a mechanical spring arrangement or the like for cushioning the bushing 92.

In the pot-shaped bushing 92, one can see the second lubricating-oil line 64 branching off laterally from the injection-molded part 90 and extending upwardly in bent-off shape towards the ball bearing 84. The upper end of the injection-molded part 90 is inserted in a central bore 94 in the shaft 33 so that a pivot bearing is formed at this point for the injection-molded part 90. The bore 94 in the shaft 33 is followed by a central channel 95 which ends in radial lateral channels near the upper end of the shaft 33, as will be described in greater detail in connection with FIG. 3.

Further, it can be seen in FIG. 2 that the stator winding 38 is provided on its outer surface with annular cooling grooves 97, 98 communicating with the cooling-oil lines 76, 77.

A connection cable is guided from the stator winding 38 through an additional bore 99 in the housing 30 to a socket 100 of the supply unit 39.

FIG. 3 shows the seals provided on the upper end of the shaft 33 in greater detail.

It will be seen first of all that the upper seal 45 is formed by a radial sliding-ring seal 105 held tightly in the upper portion of the housing 30 and leaving only an annular gap 106 to the shaft 33. The radial sliding-ring seal 105 thus forms the seal between the pump chamber 47 and the lock chamber 48.

In the downward direction, the lock chamber 48 is limited by an axial sliding-ring seal formed by an axial sliding ring 107 suspended elastically on the housing 30 via a bellows 108. The axial sliding ring 107 runs on a thrust ring 109 mounted on the shaft 33 by shrinking, with a radial annular gap 110 remaining between the rings 107, 109.

The central duct 95 in the shaft 33 ends at the level of the thrust ring 109 in several radial channels 111, 111a, 111b passing through the thrust ring 109 and ending on top in an upper bore 112 and at the bottom in a lower bore 113. The upper bore 112 ends in the annular gap 110, while the lower bore 113 is directed towards the ball bearing 83.

The ball bearing 83 which, just as the lower ball bearing 84, is seated on a radial shoulder of the shaft 33, is also supported on the other side by a bushing 118 arranged at the housing 30 via cushioning O-rings 119.

The function of the blower 10, as described with reference to FIGS. 1 to 3, is as follows:

The blower 10 can be started up by corresponding adjustment of the supply unit 39, in particular of the latter's output frequency and power output. As long as the low speeds normally encountered during the starting-up phase of the blower prevail, the pressure encountered in the pump chamber 47 is relatively low. Sensors 78, 79 pick up this pressure, just as the pressure prevailing in the lock chamber 48, and cause the vacuum pump 70 to be set in such a manner that a defined pressure drop is encountered across the upper seal 45. In addition, the compressed-air pump 55 is set in such a manner that the lubricant pressure prevailing in the first drive chamber 49 is adjusted to a pressure corresponding to the two before-mentioned pressures.

As can be seen clearly in FIG. 1, the shaft 33 is seated in a "floating" manner because the drive elements, which are symbolized in the present case by the rotor winding 37 and the stator winding 38, are arranged between the radial bearings 34, 35. The axial support of the shaft 33 is realized on the one hand by a resilient support 36 at the lower end of the shaft 33 and, on the other hand, by suitable adjustment of the pressure in the pump chamber 47.

The blower 10 is operated preferably in such a manner that the rated speed is in the supercritical range, i.e. in the range above the natural resonance of the movable system.

This results in the light-weight and compact design clearly visible in the drawing and at the same time in a reduction of the bearing forces and in safe operation, even in the critical speed range, the bushings 92, 118, which are also suspended in "floating" relationship, providing a cushioning effect for the bearings in the plane of both radial bearings 34, 35. This also helps to reduce the oscillating amplitudes and, thus, to achieve optimum quietness of the blower 10.

When the rated speed is reached, all lubricating, oil and other pressure fluid systems are in the balanced condition.

The lubricating-oil pump 62 delivers lubricating oil from the oil pan 60 into the first lubricating-oil line 63 and the second lubricating-oil line 64. The second lubricating-oil line 64 splashes lubricating oil from below upon the lower radial bearing 35, while (see FIG. 3) the first lubricating-oil line 63 leads through the central duct 95 and the, preferably, several radial ducts 111, 111a, 111b and passes thereafter through the thrust ring 109, preferably at several points. This ensures on the one hand that the thrust ring 109 is cooled and, on the other hand, that the lower seal 46 in the form of the axial sliding ring 107 on the thrust ring 109 and the upper radial bearing 34 in the form of the ball bearing 83 are lubricated by direct application of the lubricant.

The lubricating oil which emerges from the lower bore 113 almost under no pressure is mixed in the first drive chamber 49 with the compressed air entering through the compressed-air line 56 thus forming in the first drive chamber 49 an aerosol-like oil foam the pressure conditions of which can be adjusted easily and very quickly by corresponding action upon the compressed-air pump 55.

The annular gap 110 will permit a certain amount of oil/compressed-air aerosol to leak from the first drive chamber 49 into the lock chamber 48, but there it will be drawn off through the suction line 74. To achieve this, a certain pressure difference is required, and this is obtained by causing the compressed air pump 55 to maintain in the first drive chamber 49 an overpressure in the range of several bars, while the vacuum pump 70 is caused to maintain a vacuum in the lock chamber 48 through the suction line 74. These pressure conditions ensure in addition that no other leakage than that from the pump chamber 47 into the lock chamber 48 can occur through the annular gap 106 in the radial sliding-ring seal 105.

The mixture drawn off through the suction line 74 therefore contains lubricating oil, compressed air and transporting gas from the gas transportation portion 11 and possibly also vaporized cooling gas, in particular freon, that may have been admixed to the lubricating oil.

The extracted mixture is delivered to the oil separator 71 where the lubricating oil is collected in an oil sump and recirculated to the oil pan 60 through the oil return line 72, under the effect of the return oil pump 73.

Finally, there is provided a cooling system for the drive elements comprising the cooling-oil pump 75 and the cooling-oil lines 76, 77 as well as the annular cooling grooves 97, 98.

It goes without saying that the cooling system for the drive elements may be operated also with other cooling agents, such as cooling water or the like.

It is also understood that the lower radial bearing 35 (FIG. 1) may be designed and cooled in the same manner as described illustrated, in particular in FIG. 3, for the upper radial bearing 34.

Figure 4:
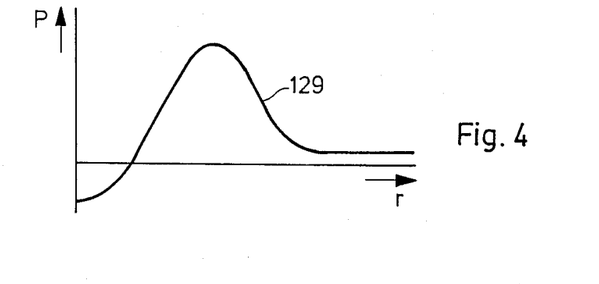
FIG. 4 shows a radial pressure curve as an additional illustration of the arrangement shown in FIG. 3.
Figure 5:
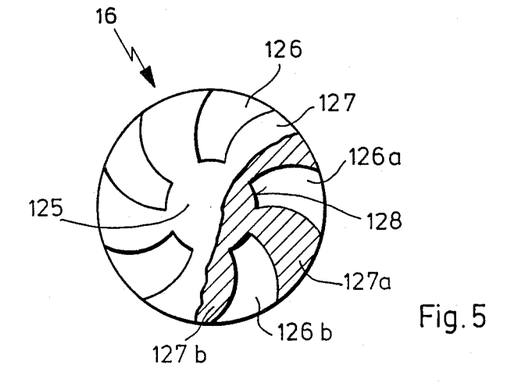
FIG. 5 is a bottom view of a radial feeder, drawn in the scale of FIG. 1.

FIGS. 4 and 5 illustrate a variant of the arrangement according to the invention. In this case, the leakage through the annular gap 106 of the radial sliding-ring seal 105 is further reduced by the generation of a radial pressure profile in the pump chamber 47, as illustrated by the curve 129 in FIG. 4.

As can be seen in FIGS. 3 and 5, the lower face 125 of the radial feeder 16 is provided with spiral grooves 126, 126a, 126b . . . with corresponding webs 127, 127a, 127b . . . arranged therebetween. The inner ends of the spiral grooves 126 end a certain distance 128 from the rotary axis of the radial feeder 16. The spiral grooves 126 as shown in FIGS. 3 and 5 are of course not true to scale, their depth being only in the range of one hundredth of a millimeter, preferably only a few $\mu$.

During rapid rotation of the radial feeder 16, the radial pressure profile as illustrated by the curve 129 in FIG. 4 occurs between the surface of the shaft 33 and the area where the pump chamber 47 communicates with the lower gas duct 20. As will be easily seen in FIG. 4, a dynamic pressure cushion is formed by a positive pressure peak in the annular chamber of the pump chamber 47 between the lower face 125 of the radial feeder 16 and the opposite upper face of the annular flange 31, which cushion acts substantially to prevent transporting gas from passing from the lower gas duct 20 into the pump chamber 47.

Figure 6:
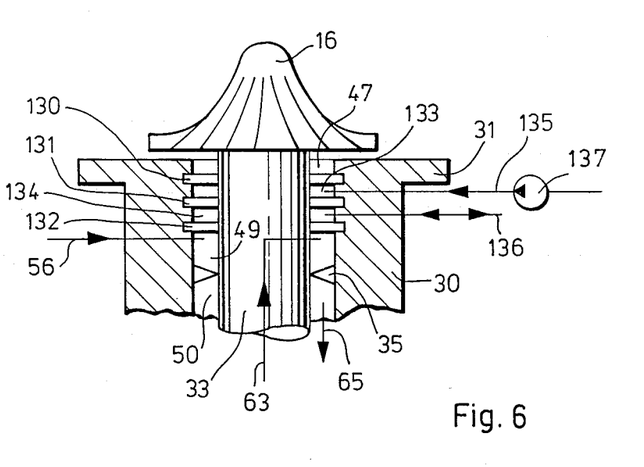
FIG. 6 shows a detail of FIG. 1, but for another embodiment of the invention.

Finally, FIG. 6 shows a variant of the invention where, contrary to the embodiments described heretofore, an axial pressure profile with a total of four pressure stages is created at the upper end of the shaft 33.

This is achieved by providing three seals 130, 131, 132 instead of only two seals (seals 45 and 46 in FIG. 1), which three seals define a pressure chamber 133 of the lock above the pump chamber 47 and an expansion chamber 134 of the lock above the first drive chamber 49.

The pressure chamber 133 of the lock is connected with the gas pressure pump 137 via an inert-gas pressure line 135, while the expansion chamber 134 of the lock communicates with the environment via a compensating line 136.

In the configuration according to FIG. 6, overpressure conditions, compared with the two neighboring spaces 47, 134, are adjusted in the pressure chamber 133 of the lock by means of the gas pressure pump 137. Accordingly, the leakage flow into the pump chamber 47 takes place in this embodiment in the opposite direction, compared with the embodiments described before. Considering, however, that the gas pressure pump 137 pumps an inert-gas mixture, preferably the inert-gas mixture contained in the gas-transporting portion 11, into the pressure chamber 133 of the lock, this leakage flow into the pump chamber 47 can be regarded as uncritical.

To the extent a leakage flow is encountered into the expansion chamber 134 of the lock, this is also uncritical, because any such leakage flow is carried off to the environment. It goes without saying that the compensating line 136 may be connected also by suitable means with the suction line 74.

What is claimed:

1. A blower for circulating large gas volumes, in particular for high-power laser systems of the gas transportation type, comprising:

gas transportation means having a first and a second gas duct for receiving and guiding said gas under circulation, said gas ducts being interconnected by a connection duct;

a radial compressor being rotatable about a vertical axis and having an upper compressor element extending into said connection duct to blow said gas from said first to said second gas duct and having further a flat lower surface, said surface being provided with spiral grooves;

a pressure-tight housing block arranged below said gas transportation means and having a flat upper surface opposite said flat lower surface and being surrounded by an atmosphere;

a vertical bore extending from said flat upper surface;

a vertical drive shaft rigidly connected with said radial compressor and said flat lower surface to rotate therewith, said shaft being received in said bore;

a first high-pressure gas chamber being formed between said flat lower surface and said flat upper surface under the action of said spiral grooves when said compressor is rotated, thus serving as an axial spiral flute bearing, said high-pressure gas chamber communicating with said second gas duct;

a first axial sealing member arranged in said bore adjacent said flat upper surface to axially seal said shaft in said bore;

a second axial sealing member arranged in said bore at a distance below said first axial sealing member to further axially seal said shaft in said bore, thus defining a lock chamber between said first and second axial sealing members and, further, defining a drive chamber below said second axial sealing member, said second axial sealing member comprising an axial upper sliding ring resting elastically on a lower thrust ring, and being connected about one circumference with one end of a bellows whose other end rests against one circumference of said housing, said thrust ring being seated on said shaft and comprising a lubricating-oil channel, connected to an axial lubricating oil supply duct in said drive shaft and having an upper bore connecting said channel with an opening in a sliding surface between said sliding ring and said thrust ring;

radial bearing means arranged in said bore at a distance below said second axial sealing member, a lower bore in said thrust ring connecting said channel to an opening in a lower surface thereof directed towards said radial bearing means;

a first fluid line connected to said lock chamber;

a second fluid line connected to said drive chamber;

a vacuum pump being connected to said first line to establish a pressure in said lock chamber that is below a pressure prevailing in said first high-pressure gas chamber; and a lubricating-oil pump being connected to said second fluid line.

2. A blower according to claim 1, wherein several channels and openings are distributed about a periphery of said thrust ring.

3. A blower according to claim 1, wherein parts forming said sliding surfaces are made of metal.

4. A blower according to claim 1, wherein parts forming said sliding surfaces are made of plastic-impregnated coal.

5. A blower according to claim 1, wherein parts forming said sliding surfaces are made of graphite.

6. A blower according to claim 1, wherein parts forming said sliding surfaces are made of plastic material.

7. A blower according to claim 1, wherein parts forming said sliding surfaces are made of ceramic material.

8. A blower according to claim 1, wherein said sliding surfaces are defined by appropriate adjustment of said surfaces such that a defined tumbling motion is produced in said fields during rotation of said shaft.

9. A blower according to claim 1, wherein said drive chamber is, further, connected to a compressed-air pump for adjusting a higher pressure in said drive chamber than that prevailing in said lock chamber.

10. A blower according to claim 9, wherein said lubricating-oil pump delivers oil from an oil pan and said oil pan being connected by a return oil pump with an oil separator arranged upstream said vacuum pump.

11. A blower according to claim 10, wherein a liquified gas, preferably Freon, is admixed to said oil in said oil pan, wherein an inlet of a compresssor, condensing said gas when evaporating from said oil, is connected to said oil pan at a connection point above an oil level, and wherein said gas, when liquified by condensation, is finally admixed again to said oil.

12. A blower according to claim 11, wherein sensors are provided for sensing a pressure prevailing in said lock chamber and in said high-pressure gas chamber, said sensors being connected to a controller, an output of said controller being actively connected with said compressed-air pump and said vacuum pump to establish predetermined pressure relations between said high-pressure gas chamber, said lock chamber and said drive chamber for different rotational blower speeds.

13. A blower according to claim 1, wherein said spiral grooves terminate at a certain distance from said vertical axis of said radial compressor.

* * * * *